United States Patent

Goddard

[11] Patent Number: 6,059,374
[45] Date of Patent: May 9, 2000

[54] SCALLOPED HUB FLANGE ROTOR

[75] Inventor: Steven G. Goddard, Fort Wayne, Ind.

[73] Assignee: Dana Corporation, Toledo, Ohio

[21] Appl. No.: 09/110,718

[22] Filed: Jul. 7, 1998

[51] Int. Cl.[7] .................................................. B60B 19/00
[52] U.S. Cl. ..................... 301/6.1; 301/105.1; 188/18 A;
188/218 XL
[58] Field of Search .......................... 301/6.1, 6.8, 105.1,
301/35.62; 188/218 XL, 18 A, 58

[56] References Cited

U.S. PATENT DOCUMENTS

| | | | |
|---|---|---|---|
| 2,191,460 | 2/1940 | Fisher | 192/107 |
| 2,233,594 | 3/1941 | Eksergian | 188/218 |
| 2,375,566 | 5/1945 | Lipps | 188/218 |
| 2,908,358 | 10/1959 | Erickson | 188/18 A |
| 2,973,836 | 3/1961 | Klaue | 188/72 |
| 3,120,882 | 2/1964 | Maloney | 188/218 |
| 3,595,345 | 7/1971 | Wachenheim | 188/72.4 |
| 3,621,945 | 11/1971 | Spry | 188/71.5 |
| 3,933,228 | 1/1976 | Otto et al. | 188/218 XL |
| 4,273,218 | 6/1981 | Morris et al. | 188/18 A |
| 4,354,711 | 10/1982 | Main | 301/6.1 |
| 4,379,501 | 4/1983 | Hagiwara et al. | 188/218 XL |
| 4,699,431 | 10/1987 | Daberkoe | 301/105.1 |
| 4,792,020 | 12/1988 | Okumura et al. | 301/6.1 |
| 4,821,848 | 4/1989 | Izumine | 188/218 XL |
| 4,848,521 | 7/1989 | Izumine | 188/18 A |
| 4,890,701 | 1/1990 | Swoboda | 188/218 XL |
| 4,913,266 | 4/1990 | Russell et al. | 188/18 A |
| 4,989,696 | 2/1991 | Buell | 188/218 XL |
| 5,190,124 | 3/1993 | Haneda | 188/218 XL |
| 5,224,572 | 7/1993 | Smolen, Jr. et al. | 188/218 XL |
| 5,501,306 | 3/1996 | Martino | 188/218 XL |
| 5,568,846 | 10/1996 | Dagh et al. | 188/218 XL |

*Primary Examiner*—S. Joseph Morano
*Assistant Examiner*—Long Bao Nguyen
*Attorney, Agent, or Firm*—Oldham & Oldham Co., LPA

[57] ABSTRACT

A hub flange and rotor assembly, both having cut out openings or scallops, wherein the scallops aid in accessing the outward facing bolt heads of the bearing flange to knuckle bolts. This configuration allows the rotor to be machined after it is installed on the hub, prior to installation of the unified assembly into the steering knuckle.

3 Claims, 3 Drawing Sheets

6,059,374

SCALLOPED HUB FLANGE ROTOR

The present invention relates to a wheel hub and brake assembly, both having cut out openings or scallops. More particularly, the present invention relates to a scalloped wheel hub flange which operates with a scalloped brake rotor flange to permit easier attachment of an assembled wheel hub/rotor/bearing unit to a knuckle than is permitted with known devices.

BACKGROUND OF THE INVENTION

A steerable drive axle of a vehicle typically includes a half axle originating at a differential at its inboard end and connecting at its outboard end at a constant velocity (CV) joint. The CV joint normally includes an inner race which is splined to the outboard end of the half axle to receive drive torque therefrom and an outer race which is coupled with the inner race to receive the torque at a constant angular velocity through a torque transferring arrangement such as torque transmitting balls. The outer race of the CV joint has a stub shaft formed as a part thereof or splined thereto. This stub shaft extends through a bore in a steering knuckle and is supported in that bore by a wheel hub to which it is splined and one or more bearing assemblies. These bearing assemblies allow the hub and the stub shaft to rotate within the bore. The hub has a wheel mounting flange formed radially thereon to allow a wheel rim to be mounted thereto and secured for rotation with the wheel hub using a plurality of wheel mounting studs and associated internally threaded wheel mounting lugnuts. A brake rotor disk is also typically secured to the wheel mounting flange by the wheel mounting studs. This brake rotor disk acts with brake calipers fixed to the knuckle for stopping rotation of the wheel rim. A tire is typically mounted on the wheel rim.

In wheel end assemblies known in the prior art, it has been necessary to install the assembled wheel hub and bearing unit into the knuckle without the rotor and to then install the rotor on the hub. This does not allow the rotor and hub to be final machined as a unit for run out control.

SUMMARY OF THE INVENTION

It is therefore an advantage of the present invention to provide the structure on a wheel hub and the corresponding brake rotor to allow the wheel hub/rotor/bearing assembly to be installed in the knuckle without removing the rotor from the hub. It is also an advantage of the present invention to allow assembly and disassembly of the wheel/hub/bearing assembly from the wheel-end direction and to permit for a final machining of the rotor brake surfaces after the rotor is installed on the hub. These advantages and others which are hereinafter stated, are provided by a wheel hub flange and brake rotor assembly comprising: a wheel hub having a central bore through which the stub shaft of the CV joint extends and which is provided with a splined internal surface suitable for seating the wheel hub on a splined outer surface of the stub shaft, and further having a flat flange which extends radially outward from the central bore and which is provided with a plurality of radially extending, equi-angularly spaced hub tabs, each of the hub tabs being provided with a hub tab bore therethrough for receiving a bolt, each hub tab bore being of the same diameter and having its center located at the same radial distance from the center of the wheel hub; and a brake rotor having a radially extending inner flange portion, an axially extending intermediate flange portion rigidly connected to the inner flange portion and extending toward the inboard side of the brake rotor, and a radially extending outer flange rigidly connected to the inner flange portion, the outer flange portion having a pair of brake discs being spaced apart and connected by a plurality of radially extending vanes, and the inner flange portion having a substantial open central region defined by a plurality of rotor tabs that extend radially inward toward the center of the brake rotor to create a plurality of scalloped areas in the open central region and that correspond in number and angular spacing to the plurality of hub tabs provided on the wheel hub, each of the rotor tabs being provided with a rotor tab bore therethrough, each rotor tab bore being of the same diameter as that of the hub tab bore provided in each of the hub tabs, and each of the rotor tab bores being situated so that its center is located at a radial distance from the center of the brake rotor, which radial distance is the same as the radial distance between the center of each hub tab bore and the center of the wheel hub, and each of the rotor tab bores being further situated so that they may be aligned with the hub tab bores, receive the bolt provided to each of the hub tab bores, and thereby form the wheel hub flange and brake rotor assembly.

This advantage and other novel features of the present invention will become apparent in the following detailed description of the invention when considered in conjunction with the accompanying drawings.

BRIEF DESCRIPTION OF THE DRAWINGS

A better understanding of the present invention will be had when reference is made to the accompanying drawings, wherein identical parts are identified by identical reference numerals and wherein.

DETAILED DESCRIPTION OF THE PRESENT INVENTION

Figure 1:
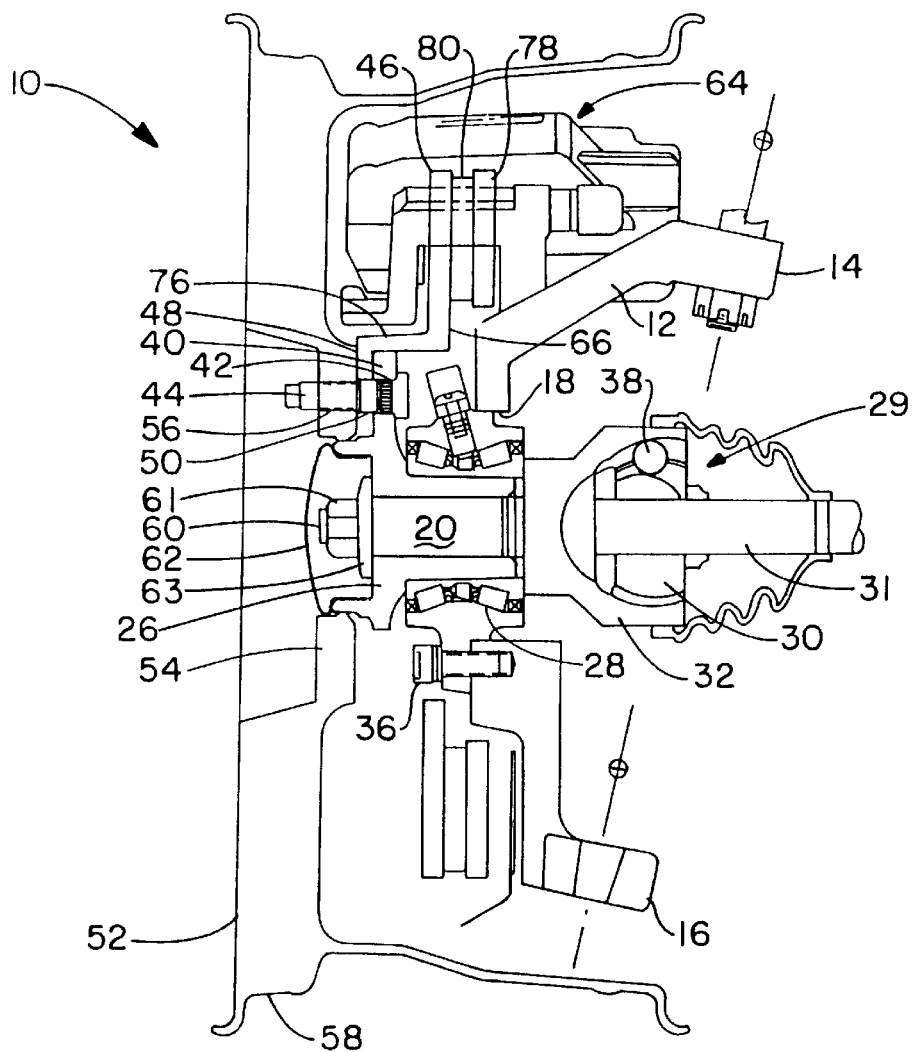
FIG. 1 is a side sectional view of a vehicle wheel end assembly of the present invention.

FIG. 1 provides a side sectional view through the axis of a motor vehicle wheel end assembly 10. A wheel end assembly 10 of this type would be utilized in conjunction with a steerable front axle of a full-time or part-time (in the case of four-wheel drive) front-wheel drive motor vehicle, although its use is not necessarily limited to such environment. The wheel end assembly 10 generally includes a steering knuckle 12 having upper and lower mounting bosses 14, 16 which provide pivotal attachment for the knuckle to the frame (not shown) of the vehicle. Steering knuckle 12 also includes a bore 18 for receiving a stub shaft 20 of a constant velocity (CV) joint. This stub shaft delivers drive torque through the bore 18 to the outboard side of the knuckle 12. This drive torque is provided to the stub shaft 20 through a linkage of the stub shaft go a half axle, which transmits torque from a differential (not shown). External splines (not shown) on stub shaft 20 allow torque transfer to internal splines (not shown) on a wheel hub 26 which is seated in bore 18. A bearing assembly 28 is interposed between the wheel hub 26 and the knuckle 12 in bore 18. As shown in FIG. 1, the CV joint 29 has an inner race 30 which is journaled onto the outboard end of the half axle 31 toward the inboard end of the hub 26 and an outer race 32, which is connected to the stub shaft 20. In FIG. 1, a bolt 36 is shown affixing the bearing assembly 28 to the knuckle 12. Between the inner and outer races 30, 32, a plurality of torque transmitting means, such as torque transmitting balls 38, allow rotation of the inner race inside the outer race.

A radially extending flange 40 on the outboard side of the wheel hub 26 has a plurality of bores 42 equally spaced around the flange. Each of these bores 42 receives a stud bolt 44, such that the stud bolt 44 faces axially outwardly. As shown in FIG. 1, the stud bolts 44 may be used to mount a brake rotor 46 with an inner flange portion 48 having a plurality of equally spaced bores 50 and a wheel rim 52 with an inner flange portion 54 having a plurality of equally spaced bores 56. The outboard end of these stud bolts would receive a lugnut (not shown) to hold the brake rotor and the wheel rim in place. An outer portion 58 of the wheel rim provides a seat for mounting a tire (not shown). The outboard end 60 of the stub shaft 20 will typically be threaded to receive a nut 61 and a flange 63 for locking the wheel hub 26 onto the stub shaft 20 and it will often be provided with a transverse bore (not shown) for receiving a cotter pin (not shown) or the like. A cap 62 is often provided to cover the outboard end of the wheel hub 26 and to protect the outboard end 60 of the stub shaft 20. In the area generally shown as 64 in FIG. 1, a brake assembly is non-rotatably attached to the knuckle 12. This brake assembly allows brake pads to be compressed against an outer flange portion 66 of the brake rotor 46.

Figure 2:
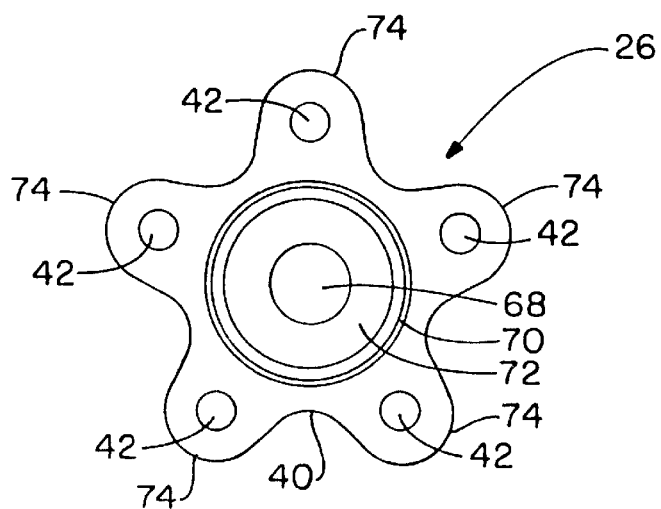
FIG. 2 is a front view of the wheel hub of the present invention.

Attention is now directed to FIG. 2, which shows the wheel hub 26 of the present invention in front elevation view. This view is from the outboard side of the hub 26 as it would be installed on a wheel end assembly 10 as shown in FIG. 1.

Central opening 68 provides the opening through which the outboard end of the stub shaft 20 may extend, as is shown in FIG. 1. A raised rib-like axial flange 70, which is frequently called a rim pilot diameter for the rim, extends outwardly from the plane of the figure and defines a shoulder for seating the wheel rim in a centered manner. Located radially between the central opening 68 and rim pilot diameter 70 is a flat radial surface 72 against which the nut 61 for locking the wheel hub 26 onto the stub shaft 20 may be received. As is very clearly shown in FIG. 2, the radially extending flange 40 is not a continuous radial web of material, but has had portions cut out so that a plurality of hub tabs 74 are provided. These hub tabs 74 are equi-angularly spaced around the circumference of the flange 40 so that the flange is symmetrical about its central axis. In FIG. 2, five hub tabs 74 are shown, although other embodiments may have a different number of hub tabs. Most embodiments would have between four and six hub tabs 74. Each hub tab 74 has an axial bore 42 which is sized to receive a stud bolt 44 as shown in FIG. 1. The centers of the axial bores 42 are equi-angularly spaced around a fixed radius of the wheel hub 26 so that the same symmetry about the central axis provided by the hub tabs is also provided by the axial bores 42.

Figure 3:
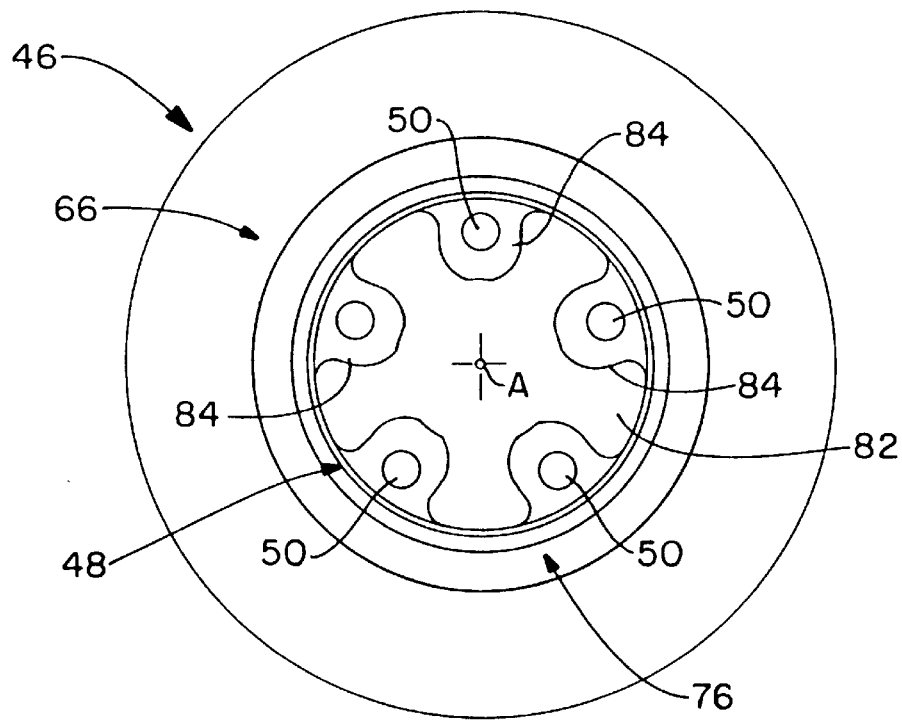
FIG. 3 is a front view of a first embodiment of the brake rotor of the present invention.

FIG. 3 shows a first embodiment of the brake rotor 46 of the present invention, in front elevation view from what would be the outboard side of the rotor. Starting from a center point A and moving radially outward, rotor 46 comprises the inner flange portion 48, a generally axial intermediate flange portion 76 and an outer flange portion 63.

The intermediate flange portion 76 permits the inner and outer flange portions to be axially offset from each other, as is clearly seen in FIG. 1. It will also be noted from FIG. 1 that outer flange portion 66 constitutes an outboard disk for the brake rotor and that there is a corresponding inboard disk 78, with the inboard and outboard disks 78, 66 being spaced apart with a series of radially-extending vanes or webs 80, disk 78 and vanes 80 being visible only in FIG. 1. This concept of corresponding spaced apart brake disks is well-known and widely used. Air spaces between the vanes or webs 80 permit air flow between the disks 66, 78, thereby cooling the braking surfaces.

FIG. 3 shows very clearly that the inner flange portion 48 is not a continuous web of material, but has either been formed or machined so that a substantial open area 82 is provided, with the remaining material constituting a plurality of rotor tabs 84. These rotor tabs 84 are equi-angularly spaced around the circumference of the flange 48 so that the flange is symmetrical about its central axis. In FIG. 3, five rotor tabs 84 are shown, although other embodiments may have a different number of rotor tabs. Most embodiments would have between four and six rotor tabs 84, and in any case, the number of rotor tabs 84 would correspond to the number of hub tabs 74 provided on the hub 26. Each rotor tab 84 has an axial bore 50 which is sized to receive a stud bolt 44 as shown in FIG. 1. The centers of the axial bores 50 are equi-angularly spaced around the same fixed radius as are the axial bores 42 on wheel hub 26.

Figure 4:
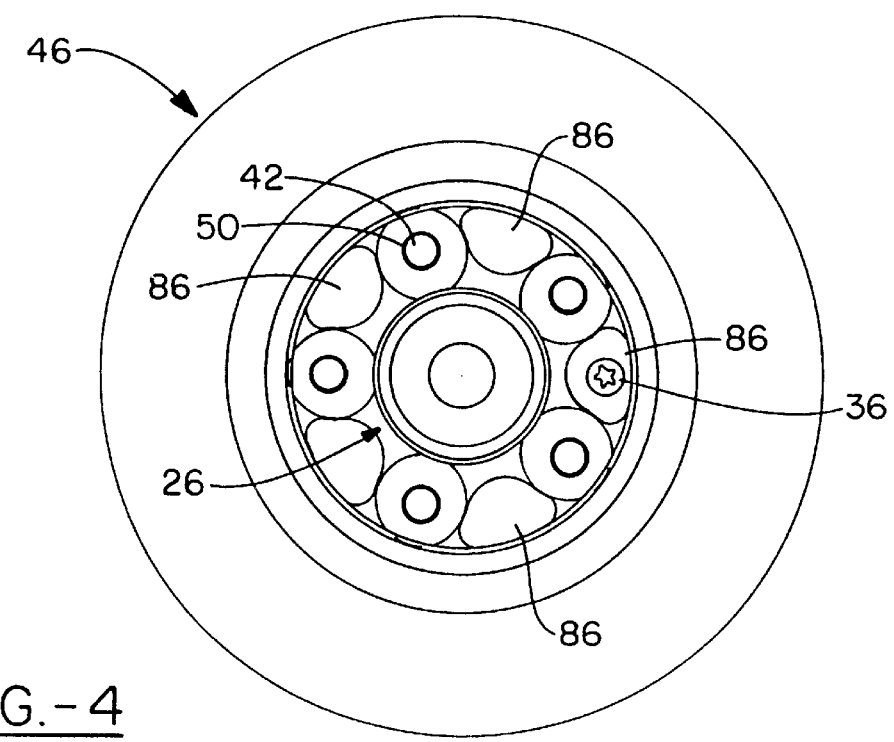
FIG. 4 is a front view of the wheel hub and the first embodiment brake rotor in an assembled condition.

Turning now to FIG. 4, wheel hub 26 and brake rotor 46 are shown in their operative juxtaposed position in a front elevation view as seen from the outboard side. From this view, it may be readily observed that wheel hub 26 and brake rotor 46 may be positioned so that each axial bore 50 in brake rotor 46 is aligned with corresponding axial bore 42 in wheel hub 26, and that this alignment process leaves a plurality of openings 86. These openings 86 are sufficiently large and are properly aligned to permit access therethrough to insert and tighten a bolt 36 such as is shown in FIG. 1 for attaching an assembled wheel hub/rotor/bearing unit into bore 18 in knuckle 12. In a similar fashion, openings 86 permit bolt 36 to be removed therethrough, allowing removal of the wheel hub/rotor/bearing unit as a unit, rather than requiring removal of the rotor to get at the bearing mounting bolt 36. The openings 86 further allow for improved rotor cooling by improving air flow through and around surfaces of discs 78 and 66 and between vanes 80.

Figure 5:
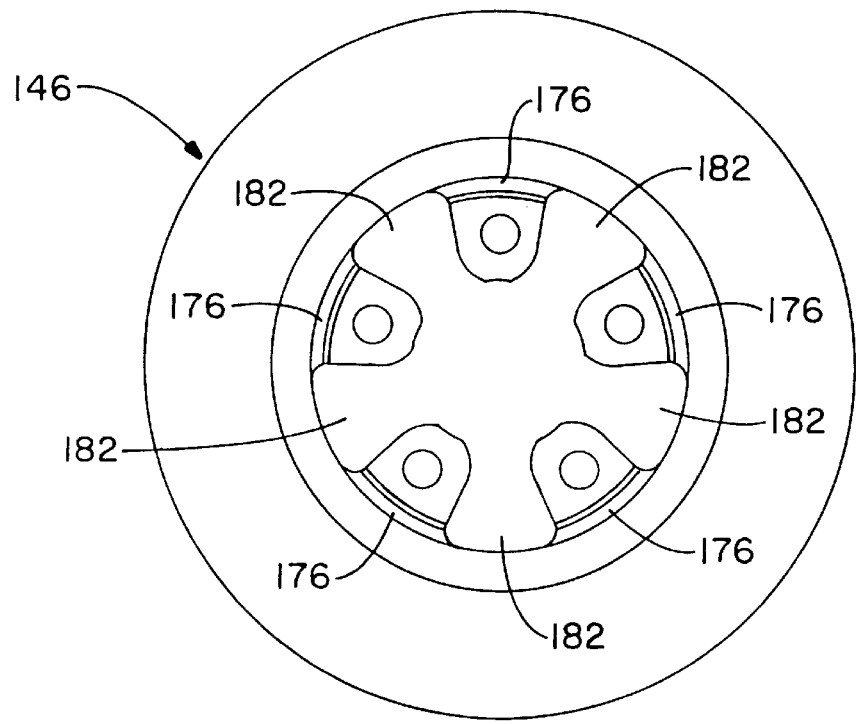
FIG. 5 is a front view of a second embodiment of the brake rotor of the present invention.
Figure 6:
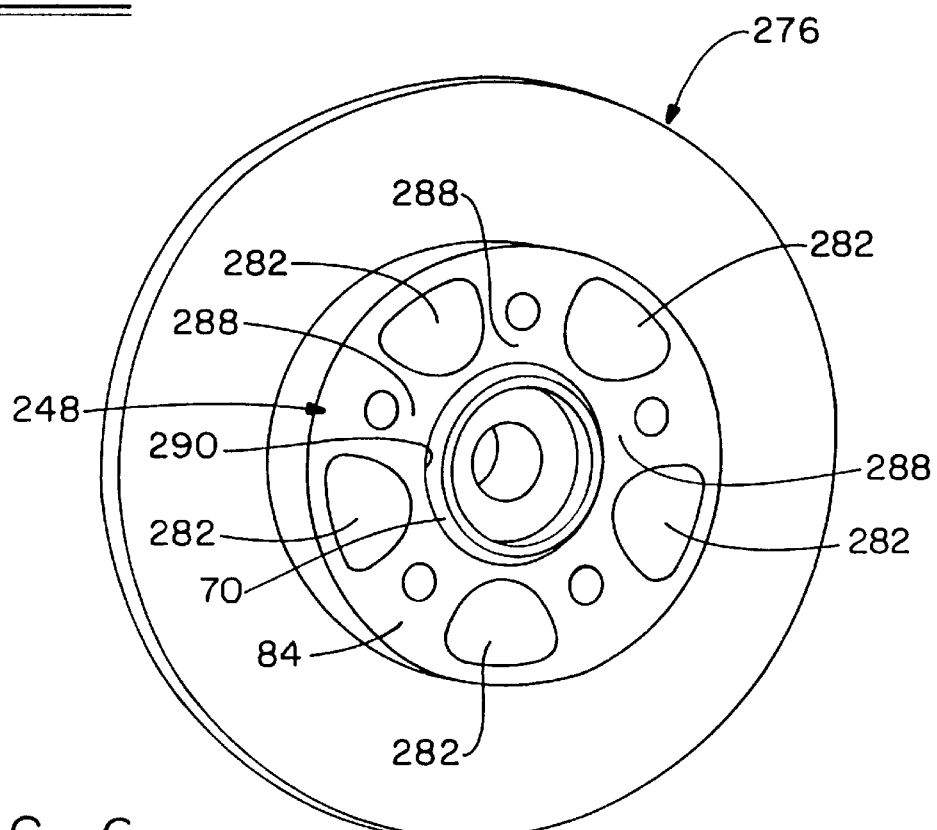
FIG. 6 is a front view of a third embodiment of the brake rotor of the present invention.

When a scalloped hub 26 as shown in FIG. 2 is used, a variety of ways to scallop the rotor become available. For example, FIG. 3 shows a case where all of the removal of material occurs in the inner flange portion 48. But FIG. 5 shows an alternate design of a brake rotor 146 in which the open area 182 is increased in size by allowing it to extend into the intermediate flange portion 176, converting it into a discontinuous web of material. Likewise, there are circumstances where less material will be removed, as in FIG. 6, where a third embodiment of the brake rotor 276 is provided. In this case, the radial inner edges of the rotor tabs 84 are joined by webs 288 with a central opening 290, which is large enough to be seated around raised flange 70 of the wheel hub 26. When this third embodiment is practiced, a plurality of open areas 282 are provided in the brake rotor on the inner flange 248, and these are each large enough to permit access to the bearing bolt 36 for attachment or removal.

In addition to allowing assembly of the wheel hub 26 and brake rotor 46 as a unit for final machining of the rotor braking surfaces, the removal of material from the brake rotor inner portions tends to reduce the weight of the inner portion, allowing the operative brake flange area 66 to be more massive and better able to absorb the heat generated in braking. In the alternative, the overall weight of the wheel end will be reduced with the same amount of ability to absorb heat in the brake flange area. Reduced weight allows for the possibility for reducing scrub radius, and the potential to use a larger constant velocity (CV) joint while still allowing the wheel end to be serviced without having to remove the complete wheel end assembly on the vehicle. The present invention also allows more design room for other design options for an inboard face of the knuckle, such as an inboard mounted hub lock.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A wheel hub flange and brake rotor assembly for use with a wheel end assembly having a steering knuckle with a bore therethrough, a stub shaft of a constant velocity (CV) joint extending through the bore in an outboard direction for transmitting a drive torque from the CV joint, and a bearing assembly rigidly connected to the steering knuckle by a bearing assembly mounting bolt and interposed, within the bore, between the stub shaft and the steering knuckle, the wheel hub flange and brake rotor assembly comprising:

a wheel hub having a central bore through which the stub shaft of the CV joint extends and further having a flat flange which extends radially outward from the central bore and which is provided with a plurality of radially extending, equiangularly spaced hub tabs, each of the hub tabs being provided with a hub tab bore therethrough for receiving a stud bolt, each hub tab bore being of the same diameter and having a center located at the same radial distance from the center of the wheel hub; and a brake rotor having a radially extending inner flange portion, an axially extending intermediate flange portion rigidly connected to the axially extending intermediate flange portion and extending toward the inboard side of the brake rotor, and a radially extending outer flange rigidly connected to the inner flange portion, the outer flange portion having a pair of brake discs being spaced apart and connected by a plurality of radially extending vanes, and the inner flange portion having a substantial open central region defined by a plurality of rotor tabs that extend radially inward toward the center of the brake rotor to create a plurality of scalloped areas in the open central region and that correspond in number and angular spacing to the plurality of hub tabs provided on the wheel hub, each of the rotor tabs being provided with a rotor tab bore therethrough, each rotor tab bore being of the same diameter as that of the hub tab bore provided in each of the hub tabs, and each of the rotor tab bores being situated so that its center is located at a radial distance from the center of the brake rotor, which radial distance is the same as the radial distance between the center of each hub tab bore and the center of the wheel hub, and each of the rotor tab bores being further situated so that the rotor tab bores are aligned with the hub tab bores, receive the stud bolt provided to each of the hub tab bores, and thereby permit the bearing assembly mounting bolt to be accessed through any one of the plurality of scalloped areas being in axial alignment with the mounting bolt.

2. The wheel hub flange and brake rotor assembly of claim 1, wherein the plurality of rotor tabs and the plurality of the scalloped areas in the open central region also extend axially into the intermediate flange portion of the brake rotor.

3. The wheel hub flange and brake rotor assembly of claim 1, wherein the wheel hub is further comprised of a raised rib-like rim pilot diameter that extends axially outward from the outboard surface of the wheel hub and that is situated between the central bore of the wheel hub and the plurality o hub tabs and wherein the plurality of rotor tabs of the brake rotor are continuously joined by a plurality of plate-like webs which subdivide the open central region into a plurality of discrete, unconnected scalloped areas interspersed among the rotor tabs and into a central opening having a diameter sufficiently large to receive the rim pilot diameter and thereby permit the brake rotor to be centrally seated on the wheel hub.

\* \* \* \* \*